UNITED STATES PATENT OFFICE.

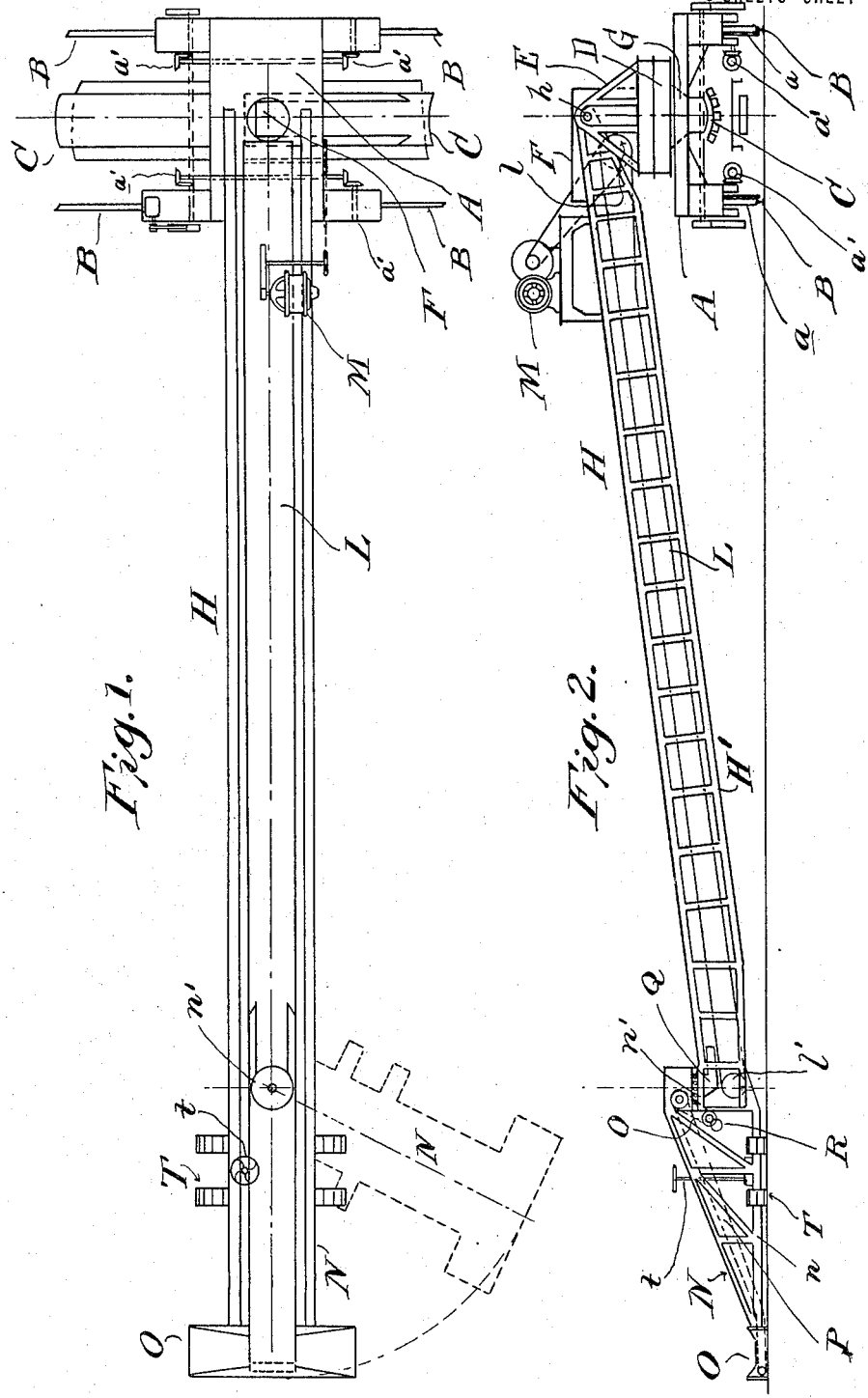

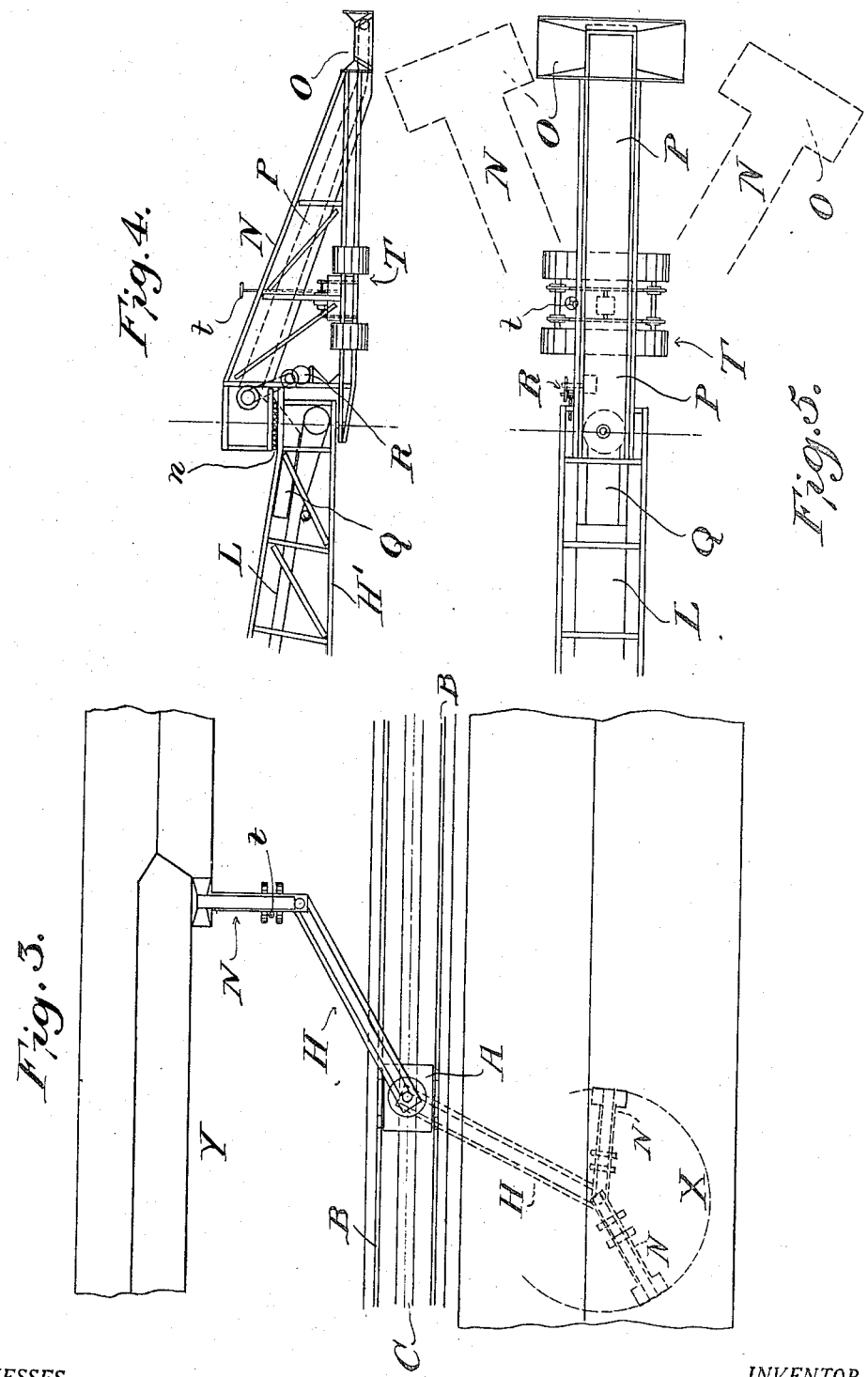

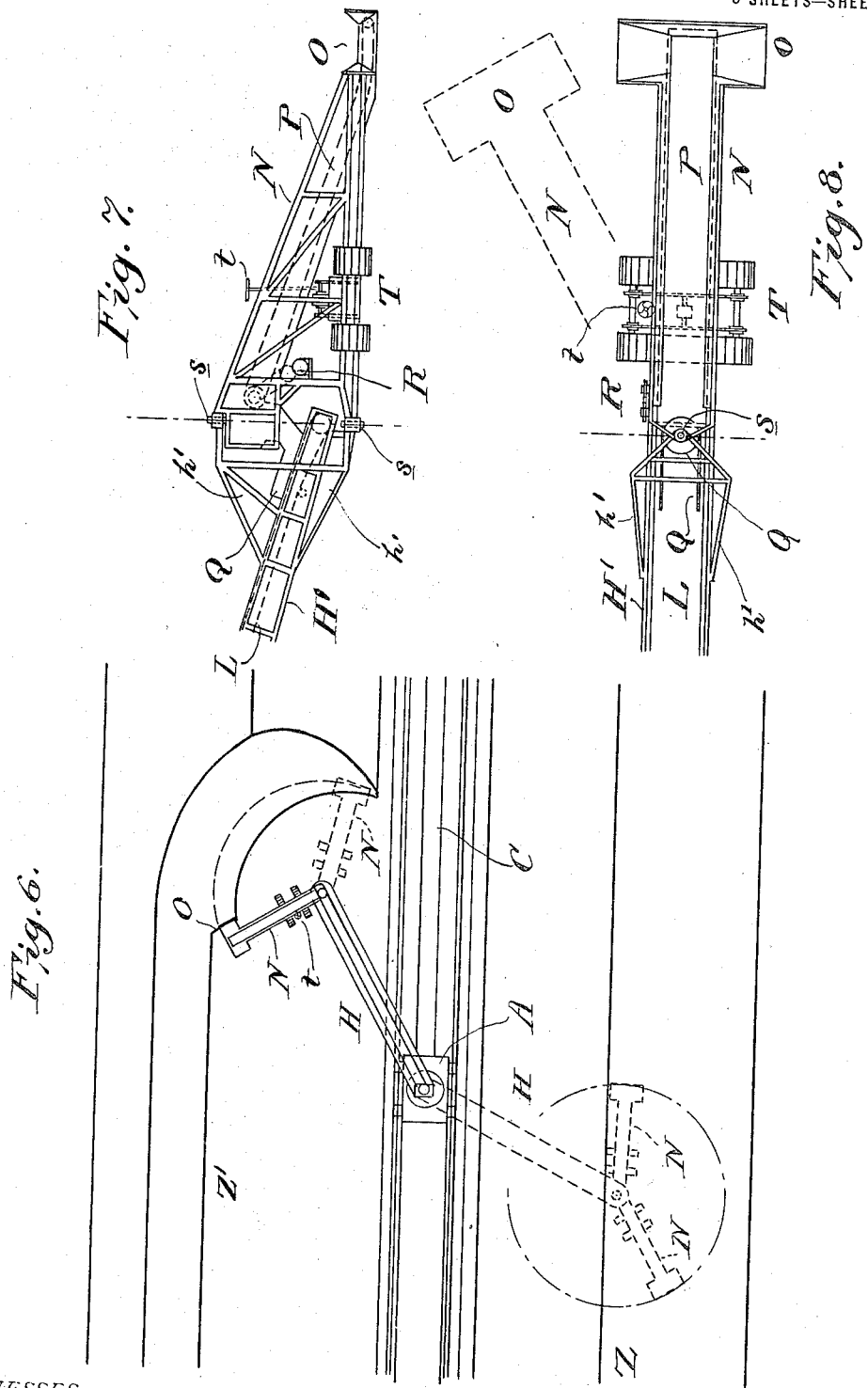

FRANCIS LEE STUART, OF WASHINGTON, DISTRICT OF COLUMBIA, ASSIGNOR TO INTERNATIONAL CONVEYOR CORPORATION, OF NEW YORK, N. Y.

RECLAIMING AND CONVEYING APPARATUS.

1,312,594.  Specification of Letters Patent.  Patented Aug. 12, 1919.

Application filed October 16, 1918. Serial No. 258,355.

*To all whom it may concern:*

Be it known that I, FRANCIS LEE STUART, a citizen of the United States, residing in Washington, District of Columbia, have invented certain new and useful Improvements in Reclaiming and Conveying Apparatus, of which the following is a specification.

This invention relates to apparatus for gathering material, such as coal, from piles or places of storage or supply in which a plow, scraper, or the like, gathers the material and transfers it to a reclaiming conveyer, the frame of which is supported at its inner end by a truck mounted to move parallel with a main conveyer belt which conveys the material to its destination and in which the reclaiming conveyer is so connected with the truck that it may be raised and lowered and also swung about a vertical axis. Reclaiming and conveying apparatus of this general kind is shown, for instance, in my U. S. Patent No. 1,271,627 of July 9, 1918.

The object of my present invention is to so construct the reclaimer that it may have a wider range of movement and may be so operated as to gather material by a swinging movement in a curved path or may be operated in a straight path parallel with the main conveyer so as to gather material from a strip parallel with said main conveyer.

In carrying out my invention I employ a truck mounted to move on rails parallel with a main conveyer belt and which is provided with a turntable to which is connected the frame of a reclaiming conveyer equipped with a conveyer belt which is motor driven and which delivers through a hopper or chute to the main conveyer belt. At its outer end, the reclaimer frame carries a section, which I call the gathering section, and which is provided with a scraper plow or other suitable gatherer which delivers to a motor driven auxiliary belt, which in turn delivers to the belt of the reclaimer. The gathering section is so mounted on the outer end of the reclaimer frame that it may be turned to any desired extent about a vertical axis and it is equipped with a tractor by means of which it may be moved either independently of the main frame of the reclaimer or together with it. Preferably the gathering section is detachable from the main frame of the reclaimer so that gathering devices of various kinds may be used.

In the accompanying drawings:—

Figure 1 is a plan view of reclaiming and conveying apparatus embodying my improvements.

Fig. 2 shows a side elevation thereof.

Fig. 3 is a diagrammatic view showing how the reclaiming apparatus may be set at the desired angle and operated to either gather material in a straight path or may be operated to gather such material in a curved path.

Fig. 4 is a detail view in side elevation of a portion of the outer end of the reclaimer and the gathering section applied thereto.

Fig. 5 is a plan view of the parts shown in Fig. 4.

Fig. 6 is a diagram illustrating how the apparatus may be operated to gather material by swinging the gathering section on the outer end of the main frame of the reclaimer and yet leave a practically straight edge to the pile from which the material is gathered. Fig. 6 also shows how material may be gathered from piles on both sides of the main conveyer belt.

Fig. 7 is a view in side elevation showing the outer end of the reclaimer and the gathering section applied thereto, and it also illustrates how the gathering section may be hinged to the outer end of the main frame of the reclaimer and detachably connected therewith.

Fig. 8 is a plan view of the parts shown in Fig. 7.

In Figs. 1 and 2, I have shown my improvements applied to conveying apparatus in which a truck A having wheels $a$ is supported on rails B disposed parallel with a main conveyer belt C which carries the gathered material to any desired place. The wheels $a$ are motor driven as indicated at $a'$, and the truck supports a turntable D, on the upper part of which are mounted standards E between which is located a hopper F which delivers centrally through the turntable and through a chute G to the main conveyer belt.

The inner end of the reclaimer H is pivotally connected at $h$ with the standards E to move about a horizontal axis, and the frame H' of the reclaimer supports a reclaiming belt L extending at its inner end around a roller $l$ driven by a motor M supported on the reclaimer frame. The outer end of the belt L extends around a roller $l'$ mounted near the lower or outer end of the reclaimer frame.

On the outer end of the main frame of the reclaimer is mounted a gathering section N comprising a frame $n$ which may be detachably connected with the main frame H' and which is pivotally connected with said frame in such manner that it may be moved to any desired extent about a vertical axis independently of any movement given to the main frame of the reclaimer. Preferably, as shown, the upper portion of the frame of the gathering section is supported on a turntable $n'$. At its outer end the frame $n$ supports a scraper plow or other suitable gathering device O and the material gathered by this device is delivered to an auxiliary conveyer belt P which carries material from the plow to a hopper Q, which delivers to the belt L of the reclaimer. The auxiliary belt is driven by a motor R supported by the frame $n$.

T indicates a tractor on which the gathering section is supported and by which it is moved. Said tractor may be set at any desired angle by steering devices $t$ and may be operated to swing or turn the gathering section in the manner indicated by dotted lines in Fig. 1. By this mechanism when the tractor is operated the reclaimer as a whole may be swung about its pivotal connection with the truck A, or the gathering section may be swung or turned about its pivotal connection with the main frame of the reclaimer without moving said main frame. It is also apparent that the tractor T may coöperate with the motor of the truck A to move the reclaimer from place to place.

By reference to Fig. 3 it will be seen that the reclaimer may be set at any desired angle with reference to the main conveyer belt and that the gathering section may be swung in a curved path to gather material from a pile as indicated at X by dotted lines in Fig. 3 or the gathering section may be moved to operate in a straight path parallel with the main conveyer belt as indicated at Y in Fig. 3.

It will be understood that the reclaimer may be moved from place to place by power applied to the truck A and also by the tractor T, but when operated to gather material the tractor T is mainly relied upon to operate the reclaimer. In such case the tractor moves the gathering section in the desired direction and inasmuch as the truck A is free to move on the track, it will be also moved so that the parts of the apparatus will always preserve the desired relation. For instance, if the reclaimer with its gathering section is disposed at the angle shown in Fig. 3, this relation will always be preserved as the tractor proceeds and thus a straight strip of material may be gathered from the pile, but as before stated the gathering section may be swung about its pivotal connection with the frame of the reclaimer as indicated by dotted lines in Fig. 3.

In Fig. 4 the details of construction shown are slightly different from those shown in Figs. 1 and 2, but similar parts are similarly lettered. H' indicates the main frame of the reclaimer, L, the reclaiming belt, and N the gathering section which is supported on the turntable $n$ and is equipped with an auxiliary conveyer P. Q indicates the hopper which delivers from the auxiliary conveyer to the conveyer L. T indicates the tractor and $t$ the steering mechanism therefor.

In Fig. 6 I have shown diagrammatically how the reclaimer may be operated on either side of the main conveyer belt to gather material from a pile Z by operating in a curved path, or may be operated in the manner indicated at Z' to gather material, in a straight path or in a curved path so as to leave the edge of the pile practically parallel with the main conveyer belt.

In Fig. 7 the frame of the gathering mechanism is slightly different, but most of the parts are similar to those before described and are similarly lettered. H' indicates the frame of the reclaimer and L, the main conveyer belt carried thereby. The lower or outer end of the frame H' has an end piece $h'$ to which the frame of the gathering mechanism is hinged as indicated at $s$ and the arrangement is such that the gathering mechanism may be detached from the main frame of the reclaimer if desired.

The tractor T is preferably a caterpillar tractor inasmuch as considerable power is required to swing the reclaimer when of large size and often the gathering mechanism operates over rough or uneven ground. I do not, however, in this application claim broadly a reclaiming apparatus in which a tractor or caterpillar tractor is employed in connection with gathering mechanism to operate the reclaimer, as claims thereto are made in my application for Patent No. 263,345 filed November 20, 1918. The claims in the present application relate particularly to a reclaimer which carries at its outer end a gathering section which is so mounted as to swing or move about a vertical axis independently of any movement given to the main frame of the reclaimer.

I claim as my invention:

1. Reclaiming apparatus, comprising a reclaiming conveyer supported at one end to swing about a vertical axis and provided at its outer end with a gathering section which is pivotally connected with the main portion of said reclaiming conveyer, and a tractor for supporting and moving said gathering section about its pivotal connection with the reclaiming conveyer.

2. Reclaiming apparatus, comprising a reclaiming conveyer supported at one end to swing about a vertical axis and provided at its opposite end with a gathering section pivotally connected with said reclaiming conveyer, and a tractor which supports both said gathering section and the outer end of the reclaiming conveyer and which serves to move the reclaiming conveyer about its vertical axis and to move said gathering section about its own axis independently of any movement given to said reclaiming conveyer.

3. Reclaiming apparatus, comprising a main conveyer, a truck mounted to move parallel therewith, a reclaiming conveyer supported by the truck and mounted thereon to swing about a vertical axis and which is provided at its outer end with a gathering section mounted to turn about a vertical axis independently of any movement given to the main portion of the reclaiming conveyer, and a tractor for supporting and moving said gathering section.

4. Reclaiming apparatus, comprising a reclaiming conveyer supported at one end to swing about a vertical axis, and provided at its outer end with a gathering section, a tractor on which said gathering section is supported and by which it is moved, and detachable connections between said gathering section and the main portion of said reclaiming conveyer.

5. Reclaiming apparatus, comprising a reclaiming conveyer supported at one end to swing about a vertical axis and provided at its outer end with a gathering section, a tractor arranged beneath and supporting said gathering section for moving said gathering section and said reclaiming conveyer about the vertical axis about which the reclaiming conveyer swings, and an auxiliary conveyer carried by said gathering section which delivers to said reclaiming conveyer.

6. Reclaiming apparatus, comprising a main conveyer, a truck mounted to move parallel therewith, a reclaiming conveyer supported by the truck and mounted thereon to swing about a vertical axis and which is provided at its outer end with a gathering section mounted to turn about a vertical axis independently of any movement given to the main portion of the reclaimer, and a tractor for supporting and moving said gathering section either independently of or in conjunction with the main portion of the reclaimer.

7. Reclaiming apparatus, comprising a main conveyer, a truck mounted to move parallel therewith, a reclaiming conveyer supported by the truck and mounted thereon to swing about a vertical axis and to also move about a horizontal axis whereby said reclaiming conveyer may be moved from one side of the truck to the other and swung or moved to any desired extent on either side of the truck, said reclaiming conveyer being provided at its outer end with a gathering section mounted to turn about a vertical axis independently of any movement given to the main portion of the reclaimer, and a tractor for supporting and moving said gathering section either independently of any movement given to the main portion of the reclaimer or to move said gathering section, said reclaimer and said truck simultaneously, or to move said gathering section and said reclaimer together or to move said gathering section independently of any movement given to either the truck or to the main portion of the reclaimer.

In testimony whereof, I have hereunto subscribed my name.

FRANCIS LEE STUART.